Feb. 28, 1939.  A. KUHNS  2,148,564
POWER TRANSMISSION GEARING ASSEMBLY
Filed March 5, 1938  3 Sheets-Sheet 1
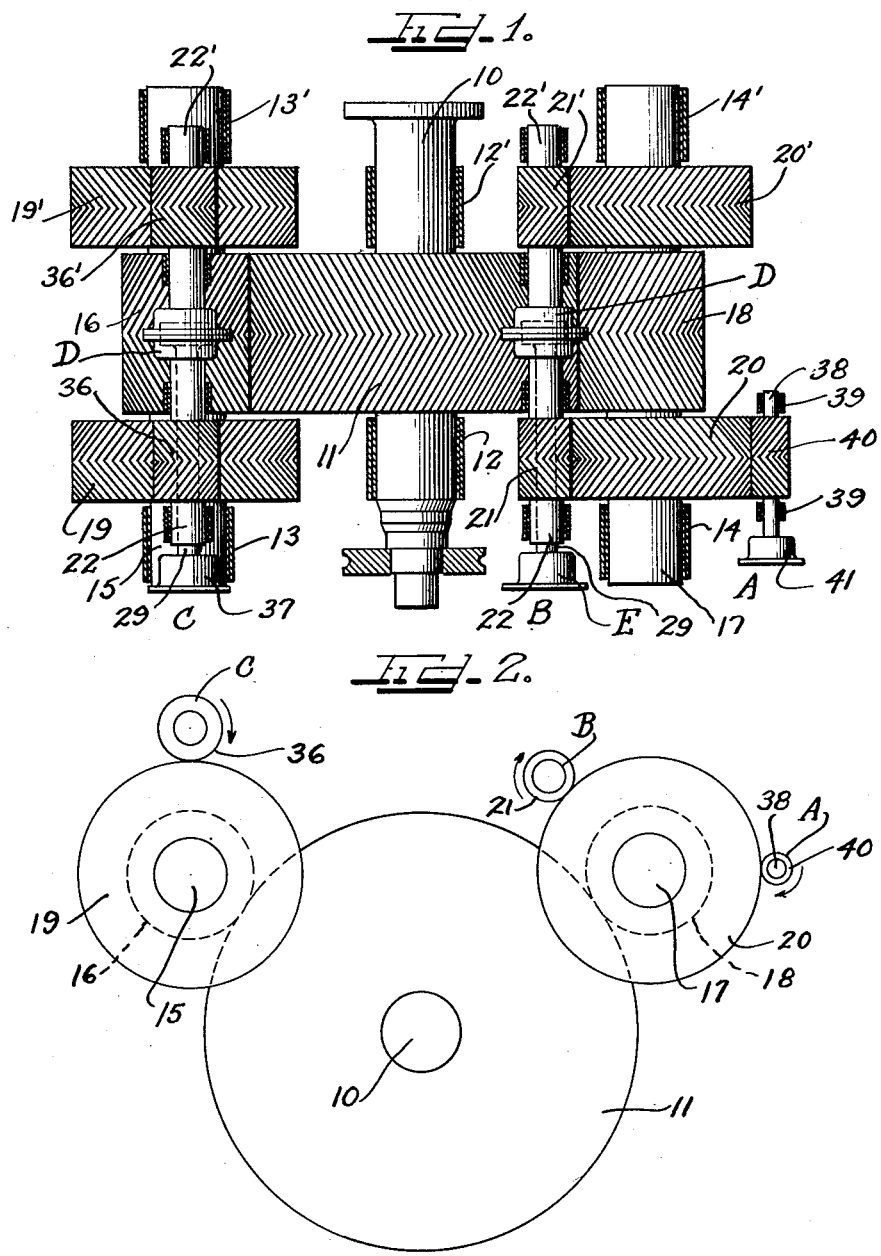
Inventor
AUSTIN KUHNS.

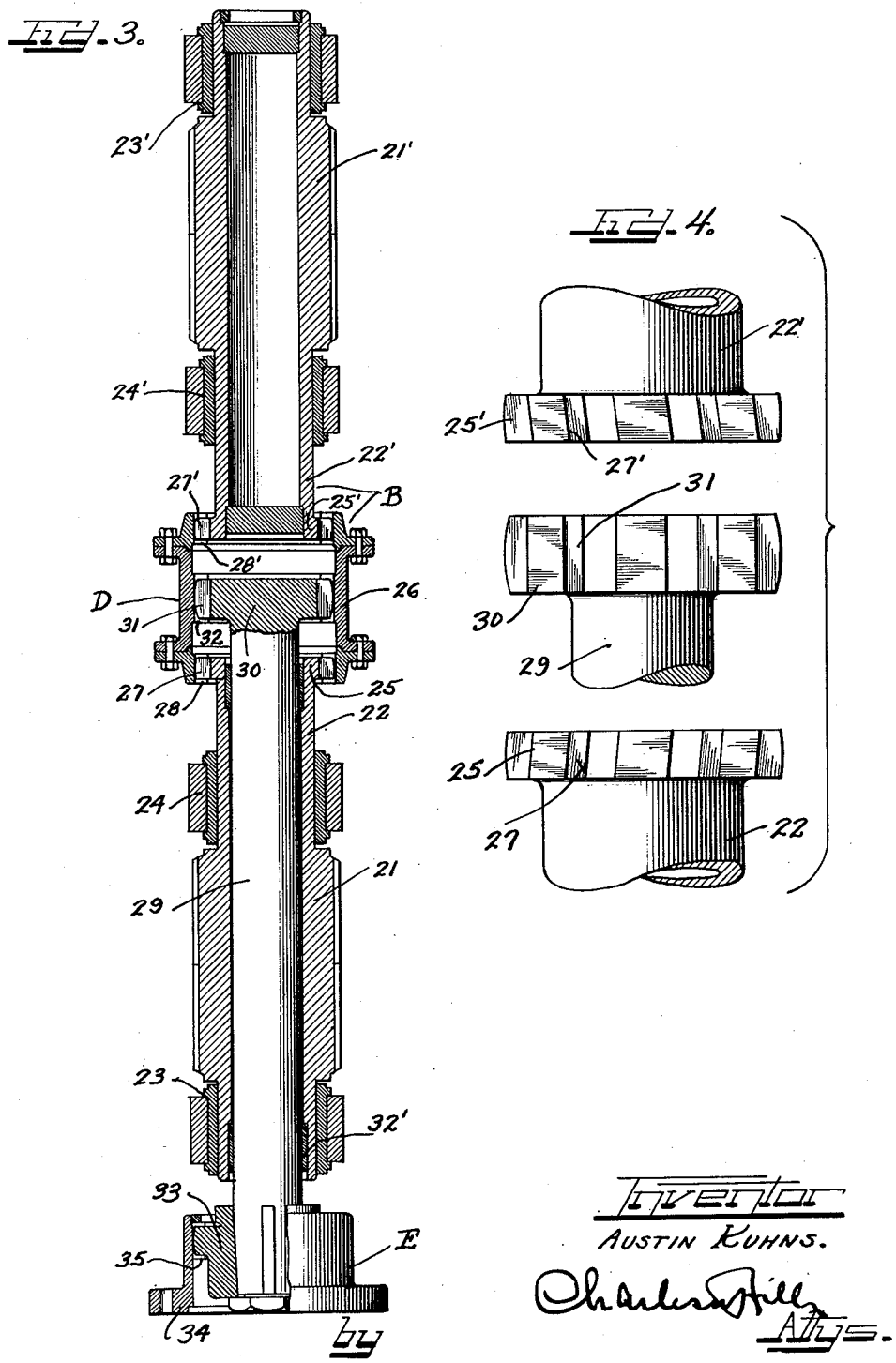

Feb. 28, 1939. A. KUHNS 2,148,564
POWER TRANSMISSION GEARING ASSEMBLY
Filed March 5, 1938 3 Sheets-Sheet 3
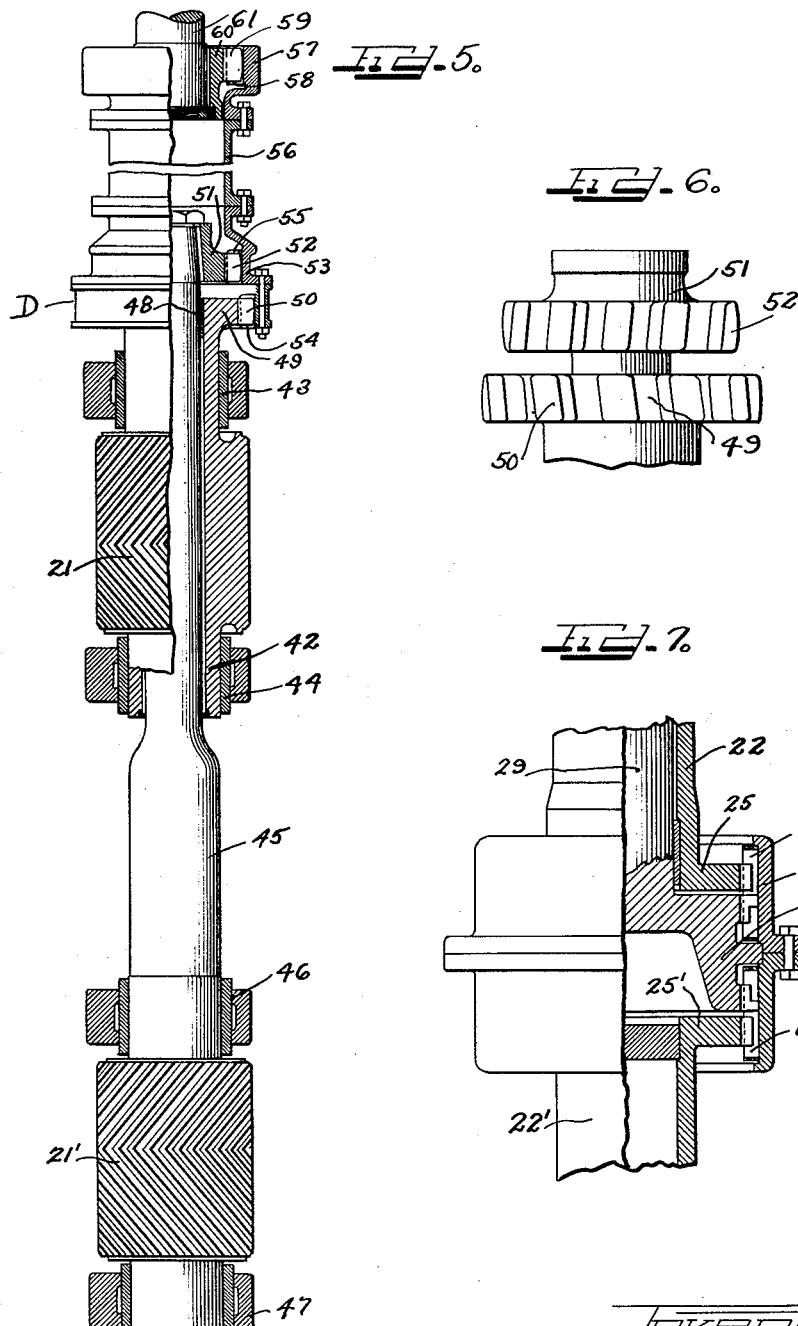
Inventor
AUSTIN KUHNS.

Patented Feb. 28, 1939

2,148,564

UNITED STATES PATENT OFFICE 2,148,564

POWER TRANSMISSION GEARING ASSEMBLY

Austin Kuhns, Buffalo, N. Y., assignor to Farrel-Birmingham Company, Incorporated, Buffalo, N. Y., a corporation of Connecticut Application March 5, 1938, Serial No. 194,095

8 Claims. (Cl. 74—410)

This invention relates to improved power transmission gearing assembly which is of particular utility in propulsion systems for marine craft for transmission of power and speed to the propeller shaft from power sources such as turbines or Diesel engines.

In systems of this type, a number of reduction gearing trains are usually provided for drive by the power source to deliver the desired power and speed to the propeller shaft gear. To insure efficient operation, it is necessary that the reduction gearing trains be arranged and adapted to transmit driving power to the propeller shaft gear in a manner to compensate for or eliminate disturbing conditions which might result from unbalanced loading, twisting or bending of gear shafts or imperfect alignment due to inaccuracies in manufacture, and to compensate for or avoid any other disturbances in order that a condition of equilibrium and balanced operation may be assured.

As the transmission gearing must be capable of delivering high horsepower at high speed or at lower speed, the use of high helical angles is very desirable on account of resulting noiseless and efficient operation. An important feature of the invention is, therefore, to provide drive pinion assemblies which will permit the use of transmission gears with double helical teeth which in turn permit the use of high helical angle without the occurrence of bending moments which might result in bending or misalinement of the drive pinion assembly shafts.

In my improved arrangement, I provide driving pinion assemblies adapted for connection with driving sources, each drive pinion assembly comprising shaft structures having pinions at the ends thereof meshing with intermediate gears on the ends of countershafts, between which intermediate gears are the transmission gears which mesh with the propeller shaft gear or mesh directly with two gears on the propeller shaft with the gear arrangement known as the single reduction. It is very important that the pinions on the drive pinion assemblies be maintained in accurate alignment, axially and radially, with the reduction gears with which they mesh in order to maintain equal load distribution, and noiseless and efficient operation. The respective drive pinions are of necessity a considerable distance apart and if these are not in perfect radial and axial alignment there will occur a serious condition of unbalanced twist, bending, and loading of the pinion shaft which is connected at one end with a driving source, and of the gear teeth themselves. An important feature of my invention is, therefore, the provision of a balanced or compensating drive for each pinion drive shaft assembly, two shaft sections being provided, each mounting a drive pinion at one end and with the other ends of the shaft sections being engaged by a special coupling device which is driven by a torque shaft connected with a driving source.

The connection of the coupling element with the shaft sections may be through yieldable or spring elements or through opposed single helical splines, and the entire arrangement is such that the coupling will produce a condition of equilibrium between the drive pinions which will compensate for slight differences in radial or axial alignment and will provide for lateral movement to conform with the requirements of expansion under heat of the reduction gear assembly, and because of the yieldable coupling connection, or the helical angle of the spline connection, will allow the respective pinions to compensate for any wobble or end motion of the reduction gear members meshed thereby and permit radial alinement or register of the double helical teeth and equal distribution of the power to be transmitted.

The above referred to and other features of the invention are incorporated in the structure shown on the drawings, in which drawings:

Figure 1 is a plan view, more or less diagrammatic, of a power transmission gearing assembly to which my invention is applied;

Figure 2 is a diagrammatic side elevation showing the various gearing assemblies and their relative centers and location.

Figure 3 is a longitudinal section of one of the drive pinion assemblies;

Figure 4 is a side elevation of the inner ends of the pinion shaft sections and the torque shaft,

Figure 5 is a longitudinal section of a modified form of drive pinion assembly,

Figure 6 is a side elevation of the driven ends of the pinion shafts of Figure 5; and Figure 7 is a side elevation, partly in section, of a modified form of drive coupling.

Referring to Figure 1, the propeller shaft 10 carries the gear 11 and is journalled in suitable bearings 12 and 12', the shaft being coupled in any suitable manner to a propeller (not shown). At opposite sides of the propeller shaft are bearing structures 13, 13' and 14, 14' respectively. The bearing structures 13, 13' journal the countershaft 15 on which is mounted the transmission gear 16 which meshes with the propulsion shaft gear 11. The bearings 14 and 14' journal the countershaft 17 on which is mounted the transmission gear 18 which meshes with the propulsion shaft gear 11.

At its opposite ends, the countershaft 15 supports the transmission gears 19 and 19' respectively which are of larger diameter than the gear 16. The countershaft 17 at its outer ends supports the transmission gears 20 and 20' respectively which, as shown, have the same diameter as the gears 19, but which may be a different diameter. The various gears are of the double helical or herringbone type.

I have shown three drive pinion assemblies A, B and C adapted for selective connection with driving sources such as turbines or Diesel engine (not shown). The assemblies A and B are associated with the transmission gears on the countershaft 17, and the assembly C is associated with the gears on the countershaft 15.

Figures 3 and 4 show the structure and arrangement of the drive assembly B which is inwardly of and above the countershaft 17 and comprises the fore and aft drive pinions 21 and 21' which mesh respectively with the intermediate gears 20 and 20' on the countershaft 17. The pinion 21 is secured on, or may form an integral part of a tubular shaft section 22 and the pinion 21' has a similar shaft section 22'. The shaft sections are axially aligned, the section 22 being journalled in bearing structures 23 and 24 and the shaft section 22' being journalled in bearing structures 23' and 24'. These various bearings together with the bearings for the propeller shaft 10 and the countershafts 15 and 17 form a rigid part of a supporting base or frame (not shown).

At their inner ends, the shaft sections 22 and 22' have heads 25 and 25', respectively, received within the ends of the housing 26 of a coupling device D. The heads have splines or teeth 27 and 27' respectively for meshing with the splines or teeth 28 and 28' on the coupling housing 26, the splines being opposed and of the single helical type.

Extending through the bore of the outer shaft section 22 is a torque shaft 29 which at its inner end projects into the coupling housing 26 and has the head 30 provided with splines or teeth 31 for engagement with the splines 32 on the housing 26 between the splines 28 and 28' and with engaging surfaces parallel to the axis of torque shaft 29. The torque shaft is suitably journalled as by bushings 32' in the shaft 22 and at its outer end is secured to the inner member 33 of a coupling structure E whose outer member 34 has spline connection 35 with the inner member 33 and is adapted for connection with a driving source such as a turbine or engine, the spline connections 31 and 35 compensating for any error or change under operating conditions in the axial alignment of the driving source shaft and the gear assembly so that the power will be smoothly delivered.

By centralizing the coupling device between the pinion shafts, the shafts may be of equal length and comparatively short with corresponding reduction of their bending or twisting movements.

The spline connection 35 permits axial shift of the shaft 29 relative to the coupling member 34, and the spline connection between the coupling housing 26 and the heads of the shafts 22 and 22' also permits relative axial movement of the shaft sections. The shaft section bearing structures are also sufficiently displaced from the ends of the pinions 21 and 21' to permit limited axial displacement of the shaft sections in the bearings. The herringbone pinions 21 and 21' may thus follow lateral displacement of the intermediate gears on the countershaft 17 so as to maintain proper tooth mesh engagement. The peripheries of the shaft heads 25 and 25' and of the head 30 of the torque shaft carry the coupling housing 26 and are slightly rounded transversely to compensate for mis-alignment of the pinion shafts.

The opposed single helical spline coupling between the shafts and the coupling housing will produce a condition of equilibrium between the forward and aft gear members which will compensate for slight differences in radial alignment in both ahead and astern and will provide for lateral movement to conform with the requirements of expansion under heat of the intermediate pinion members on the countershafts, and will allow the respective pinion members to compensate for any wobble or for end motion of their mating gear members caused by inaccuracies of manufacture or installation. Thus the intermeshed double helical gears may accurately aline and register and adapt themselves for the most efficient driving connection and transmission and equal distribution of the load.

The structure and operation of the driving pinion assembly C is the same as that of the assembly B, the pinions 36 and 36' being larger than the pinions of the assembly B to compensate for the difference in speed of the respective driving sources B and C. The torque shaft 29 of the assembly C terminates in a coupling 37 for connection with its driving source, this coupling being substantially of the same construction as the coupling E for the drive assembly B.

The driving assembly A may be the same as the driving assemblies B and C and provided with drive pinions meshing respectively with the intermediate transmission gears 20 and 20'. However, I have shown the assembly A comprising a short shaft 38 journalled in suitable bearings 39 between which the shaft supports a drive pinion 40 which meshes with the intermediate transmission gear 20, the shaft being provided at its outer end with a coupling structure 41 for connection with a driving source. The other assemblies B and C are used for high power driving and the use of the center drive and coupling connection in association with herringbone gears will compensate for inaccuracies which might otherwise disturb and prevent efficient operation, and will permit proper and efficient meshing of the various gears so that they will run quietly, and the entire operation will be in a condition of load equilibrium for smooth, efficient functioning.

In the modified arrangement of Figures 5 and 6, the coupling structure D, instead of being centrally located between the aligned drive pinion shafts, is located at the outer end of the shaft structures. The supporting shaft 42 for the drive pinion 21 is tubular and journaled in bearing structures 43 and 44 adjacent to the ends of the pinion. The supporting shaft 45 for the drive pinion 21' is journaled in bearing structures 46 and 47 adjacent to the ends of the pinion, the shaft 45 extending outwardly through the tubular shaft 42 of the pinion 21, a bushing 48 in the outer end of the shaft 42 providing bearing support for the outer end of the shaft 45. At its outer end the shaft 42 has the coupling head 49 provided with helical splines or teeth 50. The outer end of the shaft 45 has a head 51 secured thereto which has helical splines or teeth 52, the head 51 being of smaller diameter than the head 49. The coupling frame 53 surrounds the shaft heads and has opposed helical splines 54 and 55 for meshing respectively with the helical splines 50 and 52 on the heads.

The coupling frame 53 has the tubular drive link 56 secured thereto which link terminates at its outer end in a flange 57 having straight teeth or splines 58 thereon meshed by the teeth or splines 59 on the driving head 60 and parallel to the axis of the drive shaft 61 extending from the driving source (not shown).

Upon rotation of the driving coupling frame 53, the opposed helical spline connections thereof with the shaft heads will cause the pinion shafts to be simultaneously driven, the splines being of the single helical type, and with the driving and driven splines free for relative axial movement, the drive pinions will be free to follow any radial and axial displacement of the transmission gears meshed thereby, the gears being of the double helical type. The spline connection of the driving link 56 with the driving shaft 61 will permit relative axial movement, the splines which terminate in the coupling frame 53 functioning more or less as a universal drive connection between the drive shaft and the pinion shafts. The driving power is thus transmitted to the pinion shafts without disturbing the radial alignment or register of the double helical teeth of the gearing elements and with compensation for axial misalignment of the pinion shafts.

Instead of the spline connection between the coupling frame and the pinion shafts, as shown in Figure 3, a spring connection could be used. Figure 7 shows such arrangement, the head 62 of the torque shaft 29 extending into and being secured to the coupling frame 63, the head carrying spring coupling members 64 and 64' engaging respectively with the heads 25 and 25' of the pinion shafts 22 and 22' so that rotation of the coupling frame is yieldingly transmitted to the pinion shafts for relative displacement of said shafts to permit the drive pinions thereon to maintain accurate meshing engagement with the transmission gears.

Although I have shown a double helical gearing assembly as a preferred arrangement, my invention could be applied to a single helical gearing or straight spur gearing assembly.

I have shown practical embodiments of the features of my invention but I do not desire to be limited thereto as changes and modifications may be made without departing from the scope and spirit of the invention.

I claim as follows:

1. In a propulsion system of the class described, a propulsion shaft having a gear thereon, a countershaft having a pinion thereon meshing with said propulsion shaft gear, transmission gears at the opposite ends of said countershaft, and a drive pinion assembly for said transmission gears, said assembly comprising drive pinions meshing with said transmission gears, axially aligned supporting shafts for said drive pinions, a coupling housing having spline connection with the ends of said pinion shafts, and a torque shaft concentric with said coupling housing having spline connection therewith and being adapted for connection with a power source.

2. In a propulsion system of the class described, a driven shaft having spaced apart gears thereon, and a drive pinion assembly for said gears comprising pinions meshing with the respective gears, axially aligned shafts supporting said pinions at their outer ends, a coupling device having single helical drive connections with the ends of said pinion shafts, and a torque shaft concentric with said coupling and having spline driving connection therewith and adapted for connection with a power source.

3. In a propulsion system of the class described, a driven shaft having two spaced apart gears thereon, and driving assembly for said gears comprising drive pinions meshing with said gears, shafts for said pinions, a coupling device receiving the inner ends of said shafts and having helical spline driving connection therewith, and a torque shaft extending through one of said pinion shafts and adapted to transmit driving power from a power source to said coupling device.

4. In a propulsion system of the class described, a driven shaft having two spaced apart gears thereon, and a driving assembly for said gears comprising drive pinions meshing with said gears, supporting shafts for said pinions terminating at their inner ends in drive flanges having splines thereon at angles with the shaft axes, a coupling device surrounding said splined flanges and being splined for cooperation with said flange splines for drive of said pinion shafts, and a torque shaft extending through one of said pinion shafts and adapted at its outer end for connection with a power source, the inner end of said torque shaft having a splined driving flange for cooperation with splines on said coupling device for driving of said coupling device and the shaft splined thereto.

5. In a propulsion system of the class described, a driven shaft having spaced apart gears thereon, and a driving assembly for said gears comprising driving pinions for the respective gears, supporting shafts for said pinions extending therefrom, and a driving coupling for said pinion shafts having opposed single helical spline connection therewith, and means for driving said coupling.

6. In a propulsion system of the class described, a driven shaft having spaced apart gears thereon, and a driving assembly for said gears comprising driving pinions for the respective gears, supporting shafts for said pinions extending therefrom, a driving coupling for said pinion shafts having opposed single helical spline connection therewith, and means for driving said coupling, said gears and pinions being of the double helical type.

7. In a propulsion system of the class described, a driven shaft having spaced apart transmission gears thereon, and a drive pinion assembly comprising drive pinions meshing with said gears, separate axially aligned shafts for said pinions on the outer ends of which said pinions are mounted, a drive coupling device having opposed single helical spline driving connection with the inner ends of said pinion shafts, and a drive shaft for said coupling device extending therefrom through one of said pinion shafts and adapted for connection with a power source.

8. In a propulsion system of the class described, a driven shaft having spaced apart gears thereon, and a drive pinion assembly for said gears comprising pinions meshing with the respective gears, axially aligned shafts supporting said pinions, adjacent ends of said shafts terminating in coupling heads, a coupling frame receiving said heads and having yieldable spring driving connection therewith, and a drive shaft coupled to said coupling frame.

AUSTIN KUHNS.